US005567802A

United States Patent [19]

McCloskey

[11] Patent Number: 5,567,802
[45] Date of Patent: Oct. 22, 1996

[54] POLYCARBONATE REDISTRIBUTION METHOD EMPLOYING PHOSPHONIUM HYDROXIDES

[75] Inventor: Patrick J. McCloskey, Watervliet, N.Y.

[73] Assignee: General Electric Company, Schenectady, N.Y.

[21] Appl. No.: 559,869

[22] Filed: Nov. 20, 1995

[51] Int. Cl.⁶ .................................................. C08F 6/00
[52] U.S. Cl. ......................... 528/487; 525/462; 525/469; 528/196; 528/485; 528/486; 528/488; 528/490; 528/491; 528/492; 528/502 C
[58] Field of Search .................................... 525/462, 469; 528/196, 491, 492, 485, 486, 487, 488, 490, 502

[56] References Cited

U.S. PATENT DOCUMENTS

| | | | |
|---|---|---|---|
| 5,412,061 | 5/1995 | King Jr. et al. | 528/198 |
| 5,414,057 | 5/1995 | Campbell et al. | 525/462 |
| 5,459,226 | 10/1995 | King Jr. et al. | 528/196 |

*Primary Examiner*—James J. Seidleck
*Assistant Examiner*—Terressa M. Mosley
*Attorney, Agent, or Firm*—William H. Pittman

[57] ABSTRACT

Polycarbonate compositions are redistributed by melt equilibration using as the redistribution catalyst a tetraorganophosphonium hydroxide, preferably a tetra-($C_{1-6}$ alkyl)phosphonium hydroxide. Such catalysts have numerous advantages including greater redistribution efficiency, decreased color in the redistributed product and the capability of employment in the anhydrous state.

8 Claims, No Drawings

POLYCARBONATE REDISTRIBUTION METHOD EMPLOYING PHOSPHONIUM HYDROXIDES

BACKGROUND OF THE INVENTION

This invention relates to the redistribution of polycarbonates, and more particularly to a redistribution method of high efficiency which is capable of producing an improved polycarbonate material.

Polycarbonates have traditionally been prepared by an interfacial method involving the reaction of a dihydroxyaromatic compound with phosgene, or a melt method in which the phosgene is replaced by a diaryl carbonate. In recent years, however, a redistribution process for use with polycarbonates has been developed. This process, described in U.S. Pat. Nos. 5,414,057 and 5,459,226, comprises heating an already formed polycarbonate in the presence of a redistribution catalyst to produce a polycarbonate with a different, generally lower, molecular weight. The method is highly useful commercially because it permits the preparation from monomeric materials of a single high molecular weight polycarbonate, which may then undergo redistribution to yield a spectrum of lower molecular weight materials which can be custom designed depending on their intended use. A similar method, applicable to polyestercarbonates, is disclosed in copending, commonly owned application Ser. No. 08/373,805.

A broad spectrum of redistribution catalysts is disclosed in U.S. Pat. No. 5,414,057. Included are tetraalkylammonium hydroxides, tetraalkylammonium acetates, phosphines such as triphenylphosphine and organometallic compounds. The use of tetraorganophosphonium carboxylates as redistribution catalysts, disclosed in U.S. Pat. No. 5,459,226, is advantageous when the presence of amine residues in the polycarbonate, formed by the decomposition of a tetraalkylammonium material, is detrimental.

Often, the use of the aforementioned catalysts affords products having more color than is desired, particularly when use of the polycarbonate as a transparent sheet material is intended. It is also frequently found that the proportion of redistribution catalyst necessary to afford a product of the desired molecular weight is higher than expected. It has further been noted that the presence of water as a constituent of the redistribution mixture is frequently necessary for the attainment of optimum results. This is particularly true when a tetraorganoammonium or tetraorganophosphonium salt such as the acetate is employed, since an initial preferred step appears to be conversion by hydrolysis to the hydroxide which increases the reaction time.

It remains of interest, therefore, to develop new and improved redistribution methods which utilize catalysts of higher efficiency than those presently known. It is also of interest to develop improved redistribution processes which result in the formation of polycarbonates having decreased color.

SUMMARY OF THE INVENTION

The aforementioned goals are achieved by the present invention, which is a method for redistributing an organic polycarbonate composition comprising melt equilibrating an initial linear or branched organic polycarbonate composition characterized by an initial weight average molecular weight in the presence of a catalytic amount of a tetraorganophosphonium hydroxide, under conditions such that a redistributed polycarbonate composition is formed having a weight average molecular weight which is different from the initial molecular weight.

DETAILED DESCRIPTION; PREFERRED EMBODIMENTS

Any linear or branched polycarbonate composition is an acceptable starting material for the method of this invention. Suitable polycarbonate compositions include aromatic and aliphatic polycarbonates.

Preferably, the initial polycarbonate composition is an aromatic polycarbonate. Such polycarbonates typically consist essentially of structural units of the formula:

wherein at least about 60 percent of the total number of R groups are aromatic organic radicals and the balance thereof are aliphatic, alicyclic, or aromatic radicals. More preferably, R is an aromatic organic radical and still more preferably a radical of the formula:

wherein each A1 and A2 is a monocyclic divalent aryl radical and Y is a bridging radical in which one or two carbon atoms separate A1 and A2. Such radicals frequently are derived from dihydroxyaromatic compounds of the formula HO—$A^1$—Y—$A^2$—OH. For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. The most preferred dihydroxyaromatic compound is bisphenol A, in which each of $A^1$ and $A^2$ is p-phenylene and Y is isopropylidene.

Typically, the weight average molecular weight of the initial polycarbonate composition may range from values as low as 500 to values as high as 200,000, as measured by gel permeation chromatography relative to polystyrene. Preferably, the weight average molecular weight of the initial polycarbonate composition ranges from about 5,000 to about 100,000, more preferably, from about 25,000 to about 65,000.

Copolymers, as well as homopolymers, can be redistributed according to the method of this invention. Two or more different dihydroxyaromatic compounds may be employed in the preparation of the copolymer. Alternatively, a copolymer prepared from a mixture of a dihydroxyaromatic compound with a glycol, such as propylene glycol or with a hydroxy- or acid-terminated polyester may be redistributed. Polyestercarbonates, prepared from the reaction of a dihydroxyaromatic compound with the combination of a carbonate source and a dibasic acid such as adipic acid, suberic acid, azelaic acid, 1,12-dodecanedicarboxylic acid and terephthalic acid, may also be redistributed. Further, blends of aromatic polycarbonate homopolymer with any of the above-described copolymers may be employed.

Branched polycarbonates may also be used as the initial composition. Any of the commercially available branched aromatic polycarbonates may be used, such as those disclosed in U.S. Pat. Nos. 3,541,049; 3,799,953; 4,185,009; 4,469,861; and 4,431,793; all of which are incorporated by reference herein in their entirety.

The method of the invention involves melt equilibrating the initial polycarbonate composition in the presence of a tetraorganophosphonium hydroxide, preferably a tetraalkyl- and most preferably a tetra-($C_{1-6}$ alkyl)phosphonium hydroxide, as a carbonate redistribution catalyst. Melt equilibration involves heating the polymer at a temperature sufficient to produce a melt for a time sufficient to achieve redistribution equilibrium.

Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

Preferably, the method of this invention does not include incorporation into the starting materials of branching agents. Examples of such branching agents are trimellitic anhydride acid chloride, cyanuric chloride and phenolic compounds having two or more hydroxy groups per molecule, for example 1,1,1-tris(4-hydroxyphenyl)ethane. Branching agents of this type will be recognized by those skilled in the art of polycarbonate synthesis and are described in U.S. Pat. Nos. 5,021,521 and 5,097,008. Such branching agents are known to equilibrate with linear aromatic polycarbonate compositions to form branched aromatic polycarbonate compositions.

The amount of redistribution catalyst may be any amount which is effective in promoting the redistribution process. Usually the effective amount will depend upon such parameters as the reaction rate desired, the molecular weight desired in the redistributed composition, and to a lesser extent the chemical nature of the initial polycarbonate composition. Depending upon such variables, an effective amount of catalyst can easily be determined without undue experimentation. The preferred amount is generally in the range of about 15–1000 moles per million moles of carbonate structural units in the initial polycarbonate composition.

It is generally preferred that at least a small proportion of water be present in the redistribution mixture to promote the reaction. This may be achieved by employing an aqueous solution of the tetraorganophosphonium hydroxide, typically a 20–60% solution by weight.

Optionally, a diaryl carbonate may be added to the starting polycarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate may be any amount which provides the desired molecular weight in the redistributed polycarbonate composition. Usually, the amount of diaryl carbonate is no greater than about 1.5 weight percent based upon the amount of starting polycarbonate, more preferably, no greater than about 1.0 weight percent.

The method of this invention can be effected by dry mixing the starting organic polycarbonate, the carbonate redistribution catalyst, and optionally, the diaryl carbonate, and melt equilibrating the resulting mixture at a temperature in the range of about 180°–320° C., preferably about 250°–300° C. Typical melt processing techniques include melt condensation in a Helicone reactor for approximately 5–30 minutes and continuous extrusion through a single screw or twin screw extrusion device. One skilled in the art will recognize that if extrusion is employed, the screw speed and feed rate may vary. During heating, it may be necessary to vent gases formed during decomposition of the catalyst.

It is an advantage of the method of this invention that the molecular weight of the redistributed polycarbonate composition may be controlled to a fine degree. Control is generally obtained simply by varying the amounts of carbonate redistribution catalyst and diaryl carbonate employed in the redistribution process. In such a manner, it is possible to obtain from a single interfacially prepared polycarbonate composition a variety of lower molecular weight redistributed compositions heretofore available only by interfacial polymerization methods.

It is also possible to redistribute a mixture of high and low molecular weight polycarbonates to obtain a polycarbonate of intermediate molecular weight. The latter generally have narrower molecular weight distributions, as represented by dispersivity (Mw/Mn), and lower melt viscosities than simple blends of the high and low molecular weight resins. Mixtures of linear and branched resins may also be redistributed. Finally recycled polycarbonates, as illustrated by the linear optical disk grades and the branched blow molding grades, may be redistributed individually or in admixture; the products have the high ductility of the non-redistributed simple blends as well as other desirable properties.

Another advantage of the method of this invention is that the redistributed polycarbonate compositions exhibit improved melt stability when compared with the interfacially prepared starting polycarbonates. Melt stability can be ascertained by measuring the difference in the molecular weight of a polymer before and after heating in a Tinius-Olsen Extrusion Plastometer. More stable compositions will exhibit less change in molecular weight.

The invention is illustrated by the following examples.

EXAMPLES 1–2

Bisphenol A polycarbonates of two different molecular weights were blended with a 40% (by weight) aqueous tetra-n-butylphosphonium hydroxide ("TBPH") solution in a Henschel mixer for 30 seconds and extruded on a twin screw extruder at a feed rate of 4.5–6.8 kg/hr, a screw speed of 325 rpm and a barrel set temperature of 260° C. The molecular weights and, in some instances, yellowness indices of the extrudates were determined and compared with controls in which the redistribution catalysts were 20% aqueous solutions of tetraethylammonium hydroxide ("TEAH") and tetra-n-butylphosphonium acetate ("TBPA"). The results are given in the following table.

|  | Example 1 | Control 1 | Control 2 | Example 2 | Control 3 |
|---|---|---|---|---|---|
| Polycarbonate Mw: | | | | | |
| Initial | 55,000 | 55,000 | 55,000 | 42,500 | 42,500 |
| Product | 24,000 | 34,900 | 41,000 | 29,100 | 28,200 |
| Catalyst: | | | | | |
| Identity | TBPH | TEAH | TBPA | TBPH | TEAH |
| Conc., moles per $10^6$ moles* | 290 | 290 | 390 | 110 | 220 |
| Yellowness index of product | — | — | — | 2.3 | 3.8 |

*Based on polycarbonate structural units.

A comparison of Example 1 with Controls 1 and 2 shows that the method of this invention affords a lower molecular weight product in the same extrusion time, even when the proportion of catalyst employed in the control is higher. A comparison of Example 2 with Control 3 shows a decrease in yellowness index according to the invention, as well as the attainment of a comparable molecular weight with the use of half as much catalyst.

What is claimed is:

1. A method for redistributing an organic polycarbonate composition comprising contacting, at a temperature in the range of about 180°–320° C., an initial linear or branched organic polycarbonate composition characterized by an initial weight average molecular weight in the range of about 500–200,000 as measured by gel permeation chromatography relative to polystyrene, with about 15–1000 moles, per million moles of carbonate structural units in the initial polycarbonate composition, of a tetraorganophosphonium hydroxide, whereby a redistributed polycarbonate composition is formed having a weight average molecular weight which is different from the initial molecular weight.

2. A method according to claim 1 wherein the initial polycarbonate composition is a linear aromatic polycarbonate.

3. A method according to claim 2 wherein the aromatic polycarbonate is a bisphenol A polycarbonate.

4. A method according to claim 1 wherein the initial polycarbonate composition is a branched polycarbonate.

5. A method according to claim 1 wherein the initial polycarbonate composition is a polyestercarbonate.

6. A method according to claim 1 wherein the tetraorganophosphonium hydroxide is a tetraalkylphosphonium hydroxide.

7. A method according to claim 6 wherein the alkyl groups in the tetraalkylphosphonium hydroxide are $C_{1-6}$ alkyl groups.

8. A method according to claim 7 wherein the alkyl groups in the tetraalkylammonium hydroxide are n-butyl groups.

* * * * *